INVENTOR
HELMER T. PEDERSON

BY Robert B. Harmon

ATTORNEY

United States Patent Office 3,134,913
Patented May 26, 1964

3,134,913

CURRENT AMPLIFIER PROVIDING SELECTABLE RATIOS OF SUPERIMPOSED A.C. AND D.C. OUTPUTS

Helmer T. Pederson, Solana Beach, Calif., assignor to Modutronics, Inc., Solana Beach, Calif., a corporation of California Filed June 28, 1961, Ser. No. 120,211
3 Claims. (Cl. 307—88.5)

This invention pertains to current amplifier circuits, and more particularly to current amplifier circuitry providing more than one form or mode of operation.

There often arises a need for electronic circuitry which provides an output signal having both direct current and alternating current components, especially where there is a selected and carefully controlled relationship between the components as one or both are varied over an operating range of amplitude values. In particular, it is often necessary to provide a composite A.-C. D.-C. voltage wherein the A.-C. component is of an amplitude which is a fixed percentage of the amplitude of the D.-C. component, with such relative percentage remaining constant as the D.-C. amplitude is varied; a composite signal of this type is useful in, for example, checking diodes for A.-C. impedance in a manner identical with the manufacturer's original tests, as well as for checking saturable reactors. As to saturable reactors and the like, it is generally desirable to reduce the A.-C. impedance thereof by a factor of 2 when the flux density is doubled, and the usefulness of the constant-percentage type of signal in testing devices of this type is apparent.

Similarly, electrical tests or measurements are often made wherein it is necessary to provide a composite A.-C. D.-C. testing signal in which the peak amplitude of the A.-C. component remains constant as the D.-C. amplitude is varied. Among the many applications to which this type of signal may be put are the measurement of the saturation characteristics of transformers and of the A.-C. impedance of chokes and filters with direct current flowing in the windings.

Heretofore, the provision of testing signals and the like of the type set forth above has involved the use of rather cumbersome equipment and circuit arrangements, along with tedious manual control thereof.

It is accordingly a primary object of this invention to provide plural-mode current amplifier circuitry of simple and compact form the composite A.-C. D.-C output signal of which is characterized by both the constant-percentage and constant-amplitude A.-C. output signal components.

In accordance with the present invention, the above and other objects are achieved by means of a pair of transistor stages connected in cascade emitter-follower relationship. A potentiometer serves as the input control element for the first stage, with the variable tap being connected to the base of the first-stage transistor, and a source of D.-C. voltage is connected across the impedance element of the potentiometer. A first A.-C. signal input transformer has its secondary winding connected in A.-C. shunt relationship with the potentiometer impedance element, and the secondary winding of a second A.-C. signal input transformer is connected between the base and emitter of the second transistor stage. By means of this circuitry, the amplitude of the constant-current D.-C. component of the output signal in the collector circuit of the second transistor stage is determined by the setting of the variable contact on the potentiometer. The application of an A.-C. input signal to the primary winding of the first transformer results in a first mode of operation wherein the percentage relationship between the A.-C. and D.-C. components of output signal is constant for different selected amplitudes of the D.-C. component, and the application of an A.-C. input signal to the primary winding of the second transformer results in a second mode of operation wherein the A.-C. output component is constant for different selected amplitudes of the D.-C. component.

With the above considerations and objects in mind, the invention itself will now be described in connection with a preferred embodiment thereof given by way of example and not of limitation, and with reference to accompanying drawings, in which.

Figure 1:
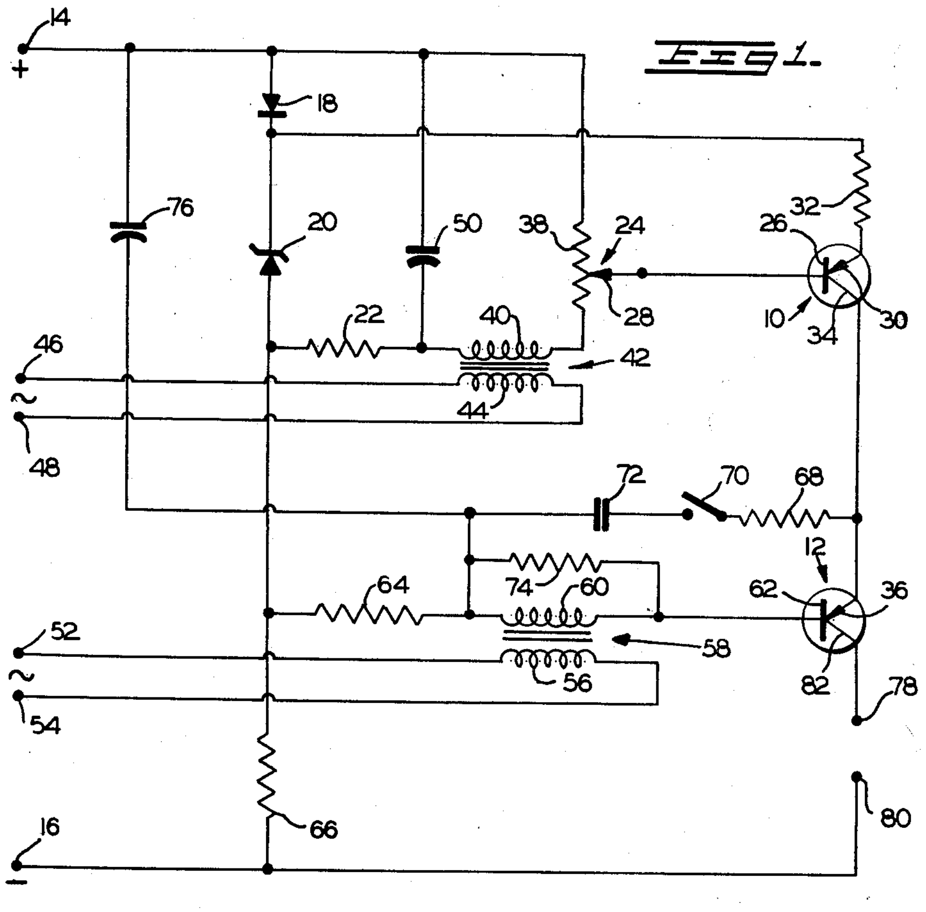
FIG. 1 is a schematic diagram of a preferred form of the invention.

Referring now particularly to FIG. 1, a pair of transistors 10 and 12 are shown connected in emitter-follower cascade relationship. Terminals 14 and 16 are the D.-C. power input terminals, and a source of D.-C. voltage (not shown) is connected between these terminals so as to render terminal 14 positive with respect to terminal 16. Diode 18 provides bias voltage for transistor 10, and Zener diode 20 is a voltage-reference diode for providing a stable D.-C. voltage for application to the input circuit of transistor 10 by means of resistor 22 and potentiometer 24.

The base 26 of transistor 10 is connected to the variable tap 28 of potentiometer 24, and emitter 30 is connected through a current-regulating resistor 32 in emitter-follower relationship to the junction between diode 18 and Zener diode 20. Collector 34 of transistor 10 is connected to emitter 36 of transistor 12, and by virtue of this connection the output current of transistor 10 passes through transistor 12.

The impedance element 38 of potentiometer 24 is connected between positive D.-C. terminal 14 and resistor 22 by means of the secondary winding 40 of a first A.-C. signal input transformer 42. The primary winding 44 of transformer 42 is connected between a first pair of A.-C. signal input terminals 46 and 48. Condenser 50 is connected between the posititive end of impedance element 38 of potentiometer 24 and the junction between resistor 22 and secondary winding 40 of input transformer 42 to effectively place the A.-C. input signal passing through transformer 42 in A.-C. shunt relationship with the impedance element 38 of potentiometer 24.

A second pair of A.-C. signal input terminals 52 and 54 are connected to the opposite ends of primary winding 56 of a second A.-C. input transformer 58, the secondary winding 60 of which is connected between base 62 of transistor 12 and a decoupling resistor 64. The other end of resistor 64 is connected to the junction of Zener diode 20 and resistor 22, such junction also being connected to one end of a current-limiting resistor 66 which is connected to negative D.-C. terminal 16.

The emitter-base circuit of transistor 12 comprises a limiting resistor 68, a single-pole, single-throw switch 70 and a condenser 72 connected in series between emitter 36 and the junction between resistor 64 and secondary winding 60 of transformer 58. A resistor 74 is connected across secondary winding 60 to prevent oscillations which might otherwise occur as a result of the impedance of transformer 58. The junction between resistor 64 and secondary winding 60 is also connected to one side of a decoupling condenser 76, the other side of which is connected to positive D.-C. terminal 14.

The output signal of the circuitry of FIG. 1 is taken between a pair of output terminals 78 and 80, the former being connected to collector 82 of transistor 12, and the latter being connected to negative D.-C. terminal 16.

As set forth above, the circuitry of FIG. 1 is intended to be operated in either of two respective modes. In each of these modes there is a steady-state or nominal D.-C. current flow which is the output current common to the two constant-current, emitter-follower stages including transistors 10 and 12. This constant-current output provided between terminals 78 and 80 is determined by the amplitude of the D.-C. source connected between terminals 14 and 16, the resistance of resistor 32 and the setting of the variable tap 28 on potentiometer 24. As will be understood by those skilled in the art, a need often arises for the provision of a constant-current signal, and the circuitry of FIG. 1 with no A.-C. input thereto provides such an output signal; thus, the constant-current output of this circuit with no A.-C. input thereto may be considered a tertiary mode of operation distinct from the two operational modes now to be discussed.

In the operation of the circuitry of FIG. 1 in a first of the two main modes discussed herein, an A.-C. signal is applied between terminals 46 and 48, such A.-C. signal being applied through input transformer 42 and bypass capacitor 50 across the impedance element 38 of potentiometer 24. The amplitude of the A.-C. input signal applied between terminals 46 and 48 is selected to provide an A.-C. component in the output current between terminals 78 and 80 of an amplitude which is a selected percentage of the nominal or steady-state D.-C. current at such output. A distinguishing feature of the first mode of operation is the fact that the A.-C. component of the output is a fixed percentage of the D.-C. component, and this percentage is selected or determined by the application of an appropriate amplitude of A.-C. input at terminals 46 and 48. In actual practice, the proper relationship may be established by moving the variable tap 28 on potentiometer 24 to the negative end of the impedance element 38 (the bottom end as seen in FIG. 1), applying an A.-C. signal at terminals 46 and 48 and varying such applied A.-C. signal in amplitude while observing the change in output current at terminals 78 and 80. When the change in the output at such output terminals equals the desired percentage of the nominal or steady-state D.-C. current, the amplitude of the A.-C. input signal at terminals 46 and 48 is fixed, and the desired ratio or percentage is automatically maintained thereafter for different settings of the variable tap 28 on potentiometer 24 in view of the fact that both the D.-C. and A.-C. inputs to potentiometer 24 are applied across the impedance element 38, and the A.-C. and D.-C. inputs are varied in unison by the motion of the variable tap 28.

Figure 2:
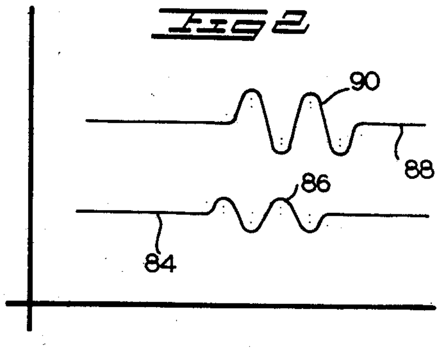
FIG. 2 is a graphical representation of the relationship between the A.-C. and D.-C. components of output current in a first mode of operation.

This first mode of operation is further illustrated by means of FIG. 2, wherein the straight line 84 represents one exemplary D.-C. output signal component, with the sine wave 86 representing a corresponding A.-C. component. If the ordinate value of the line 84 be said to be 100 arbitrary units, and the zero-to-peak amplitude of the curve 86 be 10 such arbitrary units, then the percentage of A.-C. to D.-C. is 10%, and this percentage or ratio is maintained constant in the first mode of operation for different selected values of the D.-C. component. Thus, if the D.-C. component is increased to the level indicated by straight line 88, the A.-C. component is increased in the same ratio, as indicated by the curve 90.

In the operation of the circuit of FIG. 1 in the mode just described, the switch 70 is placed in the open position, and even if an A.-C. signal is present at input terminals 52, 54, such A.-C. input has no effect in the transistor 12 in view of the open condition of switch 70. Operation of the circuit of FIG. 1 in the second mode requires the closure of switch 70, along with the application of an A.-C. input signal of the desired amplitude at terminals 52 and 54. Such application of the appropriate A.-C. input signal causes the signal to appear at the secondary winding 60 of input transformer 58, and this A.-C. signal is superimposed upon the constant-current D.-C. signal in transistor 12 supplied thereto from the collector circuit of transistor 10. As is evident, in the operation of this second mode, no A.-C. signal is applied to terminals 46 and 48, and the D.-C. current supplied to transistor 12 is of constant amplitude.

Figure 3:
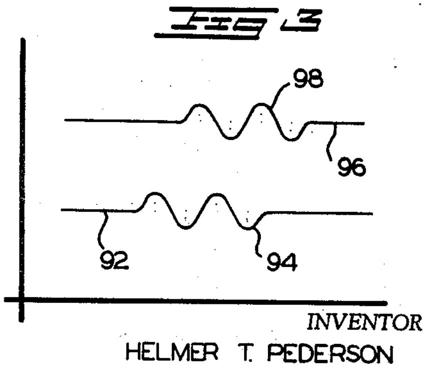
FIG. 3 is a graphical representation of the relationship between the A.-C. and D.-C. components of output current in a second mode of operation.

In further explanation of the operation of the circuitry of FIG. 1 in the second mode, reference is made to FIG. 3, in which the straight line 92 represents a given D.-C. output component taken between terminals 78 and 80. The sine wave 94 superimposed thereon represents the A.-C. component of the output resulting from the input A.-C. signal at terminals 52, 54. The distinguishing feature of the second mode of operation is that the amplitude of the A.-C. component of the output signal is constant even where the amplitude of the D.-C. component is varied. Thus, if the D.-C. ouput component is increased to a level indicated by straight line 96, such increase being a result of appropriate manipulation of the variable tap 28 on potentiometer 24, the A.-C. component of the output signal remains constant in amplitude as indicated by the curve 98.

The invention has been described above in some detail, particularly with reference to its application to the provision of specific current relationships in the measuring and testing art. However, it will be apparent to those skilled in the art that the invention is also applicable to other electronic arts where the aforementioned relative A.-C. and D.-C. characteristics are appropriate. Hence, the invention is not to be considered as limited to the particular details given, nor to the specific application to which reference has been made during the description of the circuitry, except insofar as may be required by the scope of the intended claims.

What is claimed is:

1. A plural-mode current-amplifier circuit, comprising first and second current-amplifying stages connected in cascade relationship, means for applying a selectable D.-C. voltage to said first stage to provide a constant-current output of selectable amplitude therefrom, means for connecting a load device in the output circuit of said second stage, means for applying an A.-C. voltage in A.-C. shunt relationship with said applied D.-C. voltage, the peak amplitude of said A.-C. voltage being a selectable percentage of said applied D.-C. voltage, means for concurrently varying the amplitudes of said A.-C. and D.-C. voltages applied to said first stage while maintaining constant said selectable percentage relationship therebetween to provide a first mode of operation wherein the A.-C. component of current variation in the output circuit of said second stage is a constant percentage of the D.-C. component thereof as the latter is varied, means for applying a second A.-C. voltage of a selectable amplitude to the input of said second stage in the absence of said A.-C. input to said first stage to provide a second mode of operation wherein the A.-C. component of current variation in the output circuit of said second stage is of fixed amplitude and independent of the D.-C. component thereof provided by the selectable level of constant-current output of said first stage.

2. A plural-mode current-amplifier circuit, comprising first and second transistor stages connected in cascade emitter-follower relationship, a potentiometer having its variable contact connected to the base of said first transistor, a source of D.-C. voltage connected across the impedance element of said potentiometer, a first A.-C. signal input transformer having its secondary winding connected in A.-C. shunt relationship with the impedance element of said potentiometer, and a second A.-C. signal input transformer having its secondary winding connected between the base and emitter of said second transistor stage, whereby the amplitude of the constant-current D.-C. component of the output signal in the collector circuit of said second transistor stage is determined by the setting of the variable contact on said potentiometer, the application of an A.-C. input signal to the primary winding of said first transformer results in first mode of operation wherein the percentage relationship between the A.-C. and D.-C. components of output signal is constant for different selected amplitudes of the D.-C. component, and the application of an A.-C. input signal to the primary winding of said second transformer results in a second mode of operation wherein the A.-C. output component is constant for different selected amplitudes of the D.-C. component.

3. A plural-mode current-amplifier circuit in accordance with claim 2, including a switch in the base-emitter circuit of said second transistor to open said circuit for preventing the effective application of said second A.-C. signal to said second transistor stage during operation of the circuit in such first mode.

References Cited in the file of this patent

UNITED STATES PATENTS 2,859,288 Tobias et al. -------------- Nov. 4, 1958